United States Patent
Sreeram et al.

[11] Patent Number: 6,140,767
[45] Date of Patent: Oct. 31, 2000

[54] PLASMA DISPLAY HAVING SPECIFIC SUBSTRATE AND BARRIER RIBS

[75] Inventors: Attiganal Narayanswamy Sreeram, Plainsboro; Robert L. Quinn, Trenton; Ashok Narayan Prabhu, East Windsor, all of N.J.

[73] Assignee: Sarnoff Corporation, Princeton, N.J.

[21] Appl. No.: 09/042,076

[22] Filed: Mar. 13, 1998

Related U.S. Application Data

[63] Continuation-in-part of application No. 09/001,167, Dec. 30, 1997, abandoned.
[60] Provisional application No. 60/044,310, Apr. 25, 1997.

[51] Int. Cl.[7] .................................................. H01J 17/49
[52] U.S. Cl. ........................... 313/582; 313/581; 313/567
[58] Field of Search .................................. 313/609, 610, 313/634, 636, 582, 584, 586, 587, 484, 493, 581; 445/22, 24; 345/60

[56] References Cited

U.S. PATENT DOCUMENTS

| | | | |
|---|---|---|---|
| 4,536,435 | 8/1985 | Utsumi et al. | 428/209 |
| 5,011,391 | 4/1991 | Kawasaki et al. | 445/24 |
| 5,644,327 | 7/1997 | Onyskevych et al. | 345/80 |
| 5,714,840 | 2/1998 | Tanabe et al. | 313/581 |
| 5,764,634 | 10/1997 | Wang et al. | 428/688 |
| 5,818,168 | 10/1998 | Ushifusa et al. | 313/582 |
| 5,883,462 | 3/1999 | Ushifusa et al. | 313/292 |
| 5,900,694 | 5/1999 | Matsuzaki et al. | 313/484 |
| 5,939,828 | 8/1999 | Matsuzaki et al. | 313/584 |

FOREIGN PATENT DOCUMENTS

| | | |
|---|---|---|
| 97/28554 | 8/1997 | WIPO . |
| 98/49706 | 11/1998 | WIPO . |

*Primary Examiner*—Nimeshkumar D. Patel
*Assistant Examiner*—Matthew J. Gerike
*Attorney, Agent, or Firm*—William J. Burke

[57] ABSTRACT

A plasma display having a transparent front panel spaced from a back panel which is a metal core having layers of a dielectric material extending over and bonded to the core. Conductive electrodes are on the surface of or imbedded in the dielectric layer of the back panel. The materials of which the back panel is made are chosen to form a back panel having a thermal coefficient of expansion compatible with that of the front panel. The dielectric material is made from a green ceramic tape which is bonded to the core and cofired with the core to form the back panel. Barrier ribs are formed on the back panel by embossing or scribing the green tape before cofiring the bonded assembly. Slight differences in the TCEs of the front and back panels may be compensated for by heating the panel having the lower TCE to a temperature hotter than the panel having the lower TCE during the frit seal process. Alternatively, the materials for the dielectric may be chosen such that the composite TCE of the cofired assembly matches the TCE of the front panel.

5 Claims, 4 Drawing Sheets

PLASMA DISPLAY HAVING SPECIFIC SUBSTRATE AND BARRIER RIBS

This application is a Continuation-In-Part of U.S. patent application Ser. No. 09/001,167 filed Dec. 30, 1997 now abandoned.

This application claims the benefit of U.S. Provisional Application No. 60/044,310 filed Apr. 25, 1997.

FIELD OF THE INVENTION

The present invention relates to a plasma display device and method of making the same, and, more particularly, to a plasma display in which the back panel is made of a metal core having layers of a dielectric material thereon and metal electrodes on and between the dielectric layers.

BACKGROUND OF THE INVENTION

A typical plasma display includes a front panel and a back panel both made of sheet glass (e.g. conventional float-glass). Electrical connections and mechanical structures are formed on one of both of the panels. For example, the back panel may have a ribbed structure formed on it such that the space between the ribs defines a pixel in a direct current (DC) display or column of pixels in an alternating current (AC) display. The ribs prevent optical cross-talk, that is to say, color from one pixel leaking into an adjacent pixel. Fabrication of these ribbed structures, called barrier ribs, poses a challenge both in the materials and manufacturing techniques that are used.

Plasma displays operate by selectively exciting an array of glow discharges in a confined rarefied noble gas. Full color displays are made by generating a glow discharge in a mixture of gases, such as He-Xe or Ne-Xe gas mixture to produce ultraviolet light. The ultraviolet light excites phosphors in the pixel cell, as defined by the barrier ribs, to produce light of desired color at the pixel position.

A typical plasma display back panel comprises a glass substrate having a plurality of substantially parallel, spaced first electrodes on a surface thereof. In AC displays, a thin layer of a dielectric material, such as a glass, covers the electrodes. Barrier ribs are formed on the surface of the glass substrate between the first electrodes. The barrier ribs project from the surface of the substrate at a distance greater than the thickness of the first electrodes. Red, green and blue (R-G-B) phosphor layers overlie alternating columns of the first electrodes in the spaces between the barriers and also overlie the walls of the barriers. A front transparent glass substrate, the front panel, overlies the rear panel and may rest on the barrier ribs so as to be spaced from the rear glass substrate by the barrier ribs.

Typically, the barrier ribs are walls which define troughs or channels on the back panel. Alternating current (AC) plasma displays typically have barriers that form the separators for the column pixels, and hence, have continuous vertical ribs on the back plate. By contrast, direct current (DC) plasma displays typically have ribbed barriers which isolate each pixel from all of its neighbors. Thus, for DC displays, the rib structure has a rectangular lattice-like layout. In either case, the desired resolution for the display device and its size determine the size of the ribbed barriers. In a typical display, the ribs are 0.1 to 0.2 mm in height, 0.03 to 0.2 mm wide and on a 0.1 to 1.0 mm pitch.

These barrier ribs may be formed separately from the back plate and attached using an adhesive or, as set forth in U.S. Pat. No. 5,674,634, entitled "INSULATOR COMPOSITION, GREEN TAPE, AND METHOD FOR FORMING PLASMA DISPLAY APPARATUS BARRIER RIB" to Wang et al., the barriers may be formed on the back plate by laminating a ceramic green tape to the back plate, sandblasting the green tape to form the channels between the barriers and then firing the back plate in a kiln to convert the green tape barriers into ceramic barriers.

The front panel includes an array of substantially parallel, spaced second electrodes on its inner surface. These second electrodes extend substantially orthogonally to the first electrodes. A layer of a dielectric material, typically glass, covers the second electrodes. A layer of MgO covers the dielectric layer. Voltages applied to the electrodes in the proper manner excite, maintain and extinguish a plasma in the gas within the region formed by the barriers. Addressing of individual pixels is done using external circuitry at the periphery of the panel. Barrier structures are typically used to confine the discharge to the addressed pixel, eliminating both electrical and optical cross talk between adjacent pixel elements. The columns of pixels are separated by the barriers, and the first electrodes are arranged beneath the gaps between the barriers. In a DC plasma display, the electrodes are not covered with glass or MgO, and the barrier structures are typically crossed, providing a box-like structure at each pixel element.

Although the structure described above provides a plasma display having satisfactory operating conditions, it does not solve certain problems. One problem arises from the fact that the materials used to form the back panel are desirably mutually compatible and compatible with the glass plate used for the front panel. In particular, the thermal expansion coefficient of the ceramic formed from the green tape should match the thermal expansion coefficient of the back panel and the thermal expansion coefficient of the composite back panel should match that of the front panel glass. This is to prevent the breaking of the seal which secures the back panel to the front panel during its operation.

SUMMARY OF THE INVENTION

A plasma display device of the type having a transparent glass front panel and a composite back plate including a metal substrate and a ceramic barrier rib structure, wherein the materials used to form the back panel are chosen so that the back plate has a thermal coefficient of expansion compatible with that of the front panel.

According to one aspect of the invention, channels are formed on the inner surface of the front or back panel by embossing a green tape which has been laminated onto a substrate and then cofiring the laminated panel.

According to another aspect of the invention, when the coefficients of thermal expansion of the front panel and back panel differ slightly, a method for bonding the front panel to the back panel heats the front panel and back panel to different temperatures before starting the bonding process.

According to yet another aspect of the invention, when the coefficients of thermal expansion of the front panel and metal core differ slightly, the materials used to form the dielectric which is laminated to the metal core to form the back panel assembly may be chosen such that the composite TCE of the cofired assembly matches the TCE of the front panel.

DETAILED DESCRIPTION

To improve the processing of plasma displays, a type of plasma display has been developed wherein the back panel comprises a core plate of a metal and layers of a dielectric material extending over, and bonded to the core plate. On the surfaces of the dielectric layers and between the dielectric layers are metal strips forming the various electrodes. This back panel is made by forming thin green tape layers of a dielectric material and coating the surfaces of at least some of the green tape layers with metal strips or conductive ink which form the electrodes. The green tape layers are placed on the surface of the core plate and the assembly is fired at a temperature at which the green tape layers fuse together and bond to the core plate. The firing operation is done in ambient air; no speciality gasses are needed.

Figure 1:
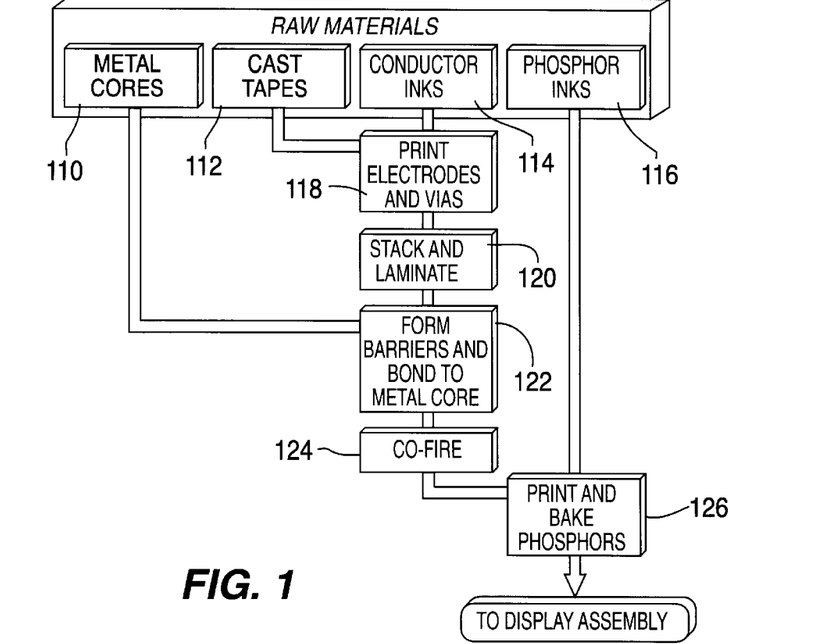
FIG. 1 is a flow chart showing the method of making the back panel of the present invention.

A plasma display according to the present invention includes a front panel made from glass, such as a float glass which has a thermal expansion coefficient of about $8.5 \times 10^{-6}/°C$., it is desirable that the back panel have a thermal coefficient of expansion compatible with that of the front panel. This prevents disrupting the seal between the back panel and the front panel during the operation of the display. For a back panel which comprises a metal core plate having layers of a ceramic material bonded thereto, novel materials and a novel materials processing system are used to ensure that the back panel is compatible with the glass front panel. FIG. 1 shows the various steps used to form a back panel according to one embodiment of the present invention.

Briefly, the components of the back panel are a metal core 110, ceramic green tapes 112, conductor inks 114 and phosphor inks 116. As described below, the metal core 110 of the back panel may be formed from metallic titanium. The ceramic green tape 112 is made as described below with reference to FIG. 2. The preparation of the conductor inks is also described below. The phosphor inks may be any of a number of commonly available preparations, such as those used to apply phosphors to cathode ray tubes (CRTs).

The first step in the process, step 118, prints the electrodes and fills vias on the green tapes using the conductor inks and an optional conductive fill paste, the composition of which is described below. The electrodes and conductive vias may be implemented on several layers of the green tape, as described below, and interconnected using vias through the green tape layers. These electrodes and vias allow the ceramic structure formed from the fired green tape to include the electrical connections between the pixel cells and the driving electronics, mounted, for example, along the edges of the display.

The next step in the process, step 120, is to stack and laminate the various green tape layers. In the exemplary embodiment of the invention, because vias are formed through at least some of the green tape layers, it is desirable to precisely align the various green tape layers before they are laminated. In the exemplary embodiment of the invention, the ceramic green tape may be laminated using a pressure of approximately 40 Kg/cm$^2$ and a lamination temperature of approximately 90° C.

After the green tape has been laminated, the metal core is prepared, at step 122, by spraying or screen printing a bonding compound onto the surface which is to receive the green tape. As described below, for the exemplary embodiment of the invention, this compound may be powdered Glass 1, a component of the exemplary ceramic green tape. Also at step 122, the green tape is attached to the metallic core and is embossed or scribed to form the barrier ribs. Although, in the exemplary embodiment of the invention, the barrier ribs are formed after the green tape is attached to the metallic core, it is contemplated that the green tape may be processed to form barrier ribs before it is attached to the core. At step 124, the combination of the metallic core and shaped green tape are co-fired at a peak temperature of approximately 900° C. After the co-fired back panel has cooled, the phosphor stripes are printed between the column barrier ribs and the back panel is baked to affix the phosphors. The application of the phosphors and the baking used to affix them may be any of a number of conventional processes commonly used to affix phosphors, for example, to CRT screens.

As described above, it is desirable for the thermal coefficient of expansion (TCE) of the metal core plate to be matched to that of the front panel. It is desirable to use soda-lime float glass (TCE about $8.5 \times 10^{-6}/°C$.) for the front panel because of its low cost. A metal with this TCE, or other arbitrary value, can generally be synthesized by laminating of different metals, e.g., Cu-Mo-Cu. In this laminate, the outer metal has a TCE that is different from the TCE of the inner metal, and the laminate takes on a TCE value intermediate between the two. The exact value depends on the relative thickness and other properties of the different layers. However, it is more convenient to chose an existing metal or alloy that meets the TCE requirement. One exemplary material is metallic titanium, which has a TCE of $8.5 \times 10^{-6}/°C$. Titanium is a rugged material, with the highest strength to weight ratio of any metal or metal alloy. Titanium is an abundant metal, readily available in vary large sheet form, moreover, it is relatively inexpensive.

Figure 2:
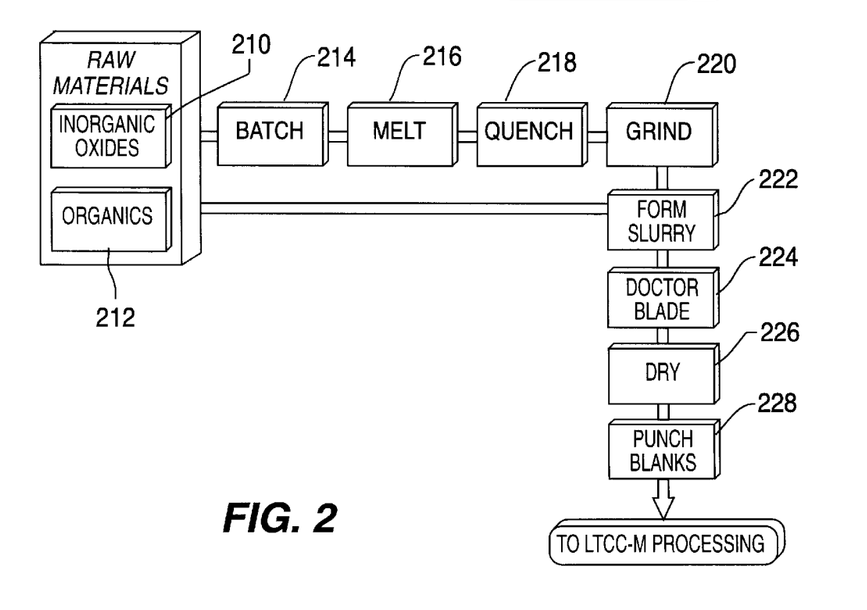
FIG. 2 is a flow chart showing the method of making the green tapes used in making the back panel of the display of the present invention.

Together with the metal core, the ceramic green tape is a chief inventory component of the back panel. As shown in FIG. 2, green tape fabrication beings with inorganic raw materials, such as MgO, Al$_2$O$_3$, SiO$_2$, B$_2$O$_3$, P$_2$O$_5$, PbO, ZnO, TiO$_2$ and various alkali, alkaline or heavy metal oxides or materials formed from them. The ingredients are mixed in a batch in proportions to achieve the desired properties. This batch is melted at 1400°–1700° C., and is quenched. The resulting glass is ground to form a powder. The glass powder is combined with organic binders, solvent, surfactants, and other modifier additives to form a slurry. The slurry is spread on a flat surface by a doctor blade process. The process of forming large sheets of ceramic tape is referred to as "casting". The cast tape formed by this process, including the glass powder, is easily stored in rolls.

The ingredients that constitute the tape, both the inorganic oxides and the various organics, are selected to provide desired tape properties. For a back panel formation, these tape properties include, the ability to be formed in large area casting, the ability to be embossed or scribed to form barrier ribs and the ability to maintain barrier shape during firing.

Ceramic green tapes are commonly cast in sizes of one to two meters wide and several meters in length. For such large area casting, the organic binders may be formulated to provide high tear strength for handling during manufacturing. It is also desirable to ensure uniform tape thickness and homogeneity throughout the cast. The organic components may also be selected to promote uniform lamination at nominal pressures (10–10,000 Kg/cm$^2$).

The barrier ribs may be formed on the back panel by a single embossing step while the ceramic tape is in the green state, i.e., prior to firing. Proper embossing depends on a combination of plastic and visco-elastic flow properties of the laminate. These flow properties are controlled principally by the organic resins blended into the slurry used to prepare the tape, and on the particle size and distribution of the inorganic ceramic powders used in the slurry.

During firing, the organics that promote the barrier formation are quickly burned off. The remaining ceramic powders melt and crystallize. The temperature of melting and of crystallization and the rate of crystallization vary from material to material. The ceramic tape composition described below provides desired melting and crystallization properties while also providing desirable properties in the final ceramic layers, including a thermal coefficient of expansion which matches that of the metallic core.

As the ceramic materials in the tape melt during the firing process, they tend to flow. Crystallization impedes this visco-elastic flow, and promotes solidification. To maintain the barrier shapes embossed into the green tape, the ceramic powder combination desirably has a crystallization temperature just lightly above the softening point (750–850° C. for the green tape composition described below with reference to Table 1). This allows the material to become more dense at the softening point, and to flow sufficiently to develop a smooth surface. The rapid crystallization, however, causes the glass to maintain the shape and form of the barriers that were fabricated when the tape was embossed or scribed in its green state.

The thermal coefficient of expansion (TCE) of the final ceramic is controlled by combining glasses with TCEs above and below the desired value. The ratio of these constituent glasses is adjusted to obtain the desired TCE. Control of TCE is important to minimize stresses in the final panel and assure panel flatness after cooling. A formulation which produces a ceramic tape having a thermal coefficient of expansion compatible with that of the titanium core and the float glass front panel and having the other desired properties for a ceramic tape is shown in Table 1.

TABLE 1

| Glass 1 | 85.00 g |
|---|---|
| Glass 2 | 12.00 g |
| TiO$_2$ | 1.00 g |
| Cordierite | 1.00 g |
| Forsterite | 1.00 g |
| | 100.00 g |

Glass 1 is a zinc magnesium borosilicate glass melted separately at 1550° C. for approximately 2 hours and rapidly quenched to form glass which is subsequently ground to a powder using a standard comminution processes. The formulation of Glass 1 is shown in Table 2:

TABLE 2

| ZnO | 30.00 g |
|---|---|
| MgO | 25.00 g |
| B$_2$O$_3$ | 20.00 g |
| SiO$_2$ | 25.00 g |
| | 100.00 g |

Glass 2 is a magnesium aluminosilicate glass with boron trioxide and phosphorous pentoxide added as nucleating agents and is melted separately at 1725° C. for approximately an hour and rapidly quenched to form glass which is subsequently ground to a powder using the standard comminution processes. The formulation of Glass 2 is shown in Table 3:

TABLE 3

| Al$_2$O$_3$ | 16.81 g |
|---|---|
| MgO | 42.01 g |
| P$_2$O$_5$ | 0.84 g |
| B$_2$O$_3$ | 0.84 g |
| SiO$_2$ | 39.50 g |
| | 100.00 g |

Although the compositions given in Tables 1, 2 and 3 perform well, it is contemplated that compositions corresponding to the ranges, defined by percent weight, set forth in Tables 1', 2' and 3' produce acceptable ceramic materials for use with the subject invention.

TABLE 1'

| Glass 1 | 65.00–95.00 |
|---|---|
| Glass 2 | 30.00–5.00 |
| TiO$_2$ | 0.01–2.00 |
| Cordierite | 0.01–2.00 |
| Forsterite | 0.01–2.00 |
| | 100.00 |

TABLE 2'

| ZnO | 15.00–50.00 |
|---|---|
| MgO | 10.00–45.00 |
| B$_2$O$_3$ | 5.00–30.00 |
| SiO$_2$ | 10.00–45.00 |
| | 100.00 |

TABLE 3'

| Al$_2$O$_3$ | 5.00–30.00 |
|---|---|
| MgO | 30.00–55.00 |
| P$_2$O$_5$ | 0.01–4.00 |
| B$_2$O$_3$ | 0.01–4.00 |
| SiO$_2$ | 0.01–4.00 |
| | 100.00 |

The glass composition set forth in table 1 (or table 1') is mixed with organic solvents in the proportion shown in Table 4.

TABLE 4

| | | |
|---|---|---|
| Glass composition (Table 1 or 1') | 70.30 | g |
| Solvent 1 | 13.80 | g |
| Resin 1 | 15.90 | g |
| | 100.00 | g |

The formulations for Solvent 1 and Resin 1 are given in Tables 5 and 6 below.

TABLE 5

| Solvent 1 | | |
|---|---|---|
| methyl ethyl ketone | 46.90 | g |
| Ethanol | 46.90 | g |
| Fish oil | 6.20 | g |
| | 100.00 | g |

TABLE 6

| Resin 1 | | |
|---|---|---|
| methyl ethyl ketone | 36.10 | g |
| Ethanol | 36.10 | g |
| #160 plasticizer | 11.10 | g |
| B-98 resin | 16.70 | g |
| | 100.00 | g |

An alternative green tape formulation which has a thermal coefficient of expansion which matches that of Titanium is shown in Table 7.

TABLE 7

| | | |
|---|---|---|
| Glass 1 | 66.10 | g |
| Forsterite | 4.20 | g |
| Solvent 1 | 13.80 | g |
| Resin 1 | 15.90 | g |
| | 100.00 | g |

The process for forming the ceramic green tape is shown in FIG. 2. This process begins with the raw materials. As described above Glass 1 and, optionally, Glass 2, are separately prepared by mixing (step 214) a batch, melting (step 216) the batch at the temperatures and for the times described above, quenching (step 218) the molten mixture to form a glass and grinding the glass to form a powder. In the exemplary embodiment of the invention, the glasses Glass 1 and Glass 2 are ground to have a particle size of approximately 10 microns. The fillers, Forsterite and, optionally, Cordierite are ground to have a particle size of approximately 6.5 microns.

Next, at step 222, the ground glasses and fillers are combined in a 250 ml beaker with the organics in the proportions shown in Table 4 to form a slurry. For this step, the glass powder mixture is thoroughly mixed first with Solvent 1 and then with Resin 1. The slurry mixture is then milled, also in step 222, by placing the slurry in a one liter milling jar containing 150 ml ⅜" $ZrO_2$ rollers and placing the jar on a roll mill for at least two hours. The slurry is then strained into a container to remove the rollers and de-aired for one minute while stirring. Incomplete de-airing results in pinholes or small bubbles in the cast tape. Excessive de-airing results in the removal of too much of the solvent, which results in a slurry which is too viscous.

This slurry is formed into sheets at step 224 using a doctor blade process. The first step in this process is to measure the viscosity of the de-aired slurry. A typical viscosity is between 700 and 1100 cps. Next, a 3-mil mylar sheet is prepared by applying a silicon release agent to the top surface of the sheet. Next, the doctor blade is adjusted to obtain the desired thickness of the tape. A blade opening of 15 mils is used to obtain a green tape thickness of 8 mils. The slurry is then poured into the tape caster. Initially, the mylar is pulled at a speed of 20 cm/min until the slurry appears at the output area of the tape caster. Then the pull speed is increased to 90 cm/min. Because of the abrasive properties of the slurry, the doctor blade and the tape casting head may periodically need to be reground or replaced. At step 226, the sheets are dried for at least 30 minutes before being removed from the tape caster. As a quality control step, the cast tape is viewed on a light box for imperfections and the thickness and density of the tape are measured at several points along the cast tape. At step 228, the green tape is punched to prepare blanks which may have conductor paste and fill paste applied to them to form electrodes and interconnecting circuitry, at step 118 of FIG. 1, before being laminated, at step 120, to the metal core. The composition of a suitable conductor paste is set forth in Tables 8 and 9 and the composition of a suitable fill paste is set forth in Table 10.

TABLE 8

| Conductor Paste | | |
|---|---|---|
| Ag Powder EG (~7.6 microns) | 82.40 | g |
| Solvent 2 | 16.50 | g |
| Lecithin | 0.55 | g |
| Terpineol | 0.55 | g |
| | 100.00 | g |

TABLE 9

| Solvent 2 | | |
|---|---|---|
| Ethyl cellulose N-309 | 3.80 | g |
| Ethyl cellulose N-14 | 7.50 | g |
| Butyl carbitol | 53.20 | g |
| Dodecanol | 35.50 | g |
| | 100.00 | g |

TABLE 10

| Conductor Fill Paste | | |
|---|---|---|
| Ag Powder EG (~7.6 microns) | 55.90 | g |
| PAS glass | 22.30 | g |
| Hypermer PS-2 | 1.20 | g |
| EC N-300 | 0.69 | g |
| Butyl carbitol | 7.91 | g |
| Elvacite 2045 | 1.80 | g |
| Terpineol | 5.40 | g |
| #160 plasticizer | 3.60 | g |
| Thixotrol | 1.20 | g |
| | 100.00 | g |

In the above conductor fill paste compound, PAS glass is 50% PbO, 40% $SiO_2$ and 10% $Al_2O_3$, all by weight. In the composition, the PAS glass is first made and ground into a powder before being used in the conductor paste.

These conductor pastes are screen-printed onto the green tape prior to the barrier formation process. The inventors have determined that these pastes withstand the barrier formation processes, particularly the high pressures, without breaking any conductor traces while maintaining good electrical conductivity. The fill paste formulation set forth in Table 10 matches the sintering characteristics and the coefficient of thermal expansion of the glass-ceramic formulation described above with reference to Tables 1 to 3.

During the laminating process, the green tape is bonded to the metal core using a glaze. An exemplary glaze suitable for this purpose is formed from a powder of Glass 1 to bond the green tape formulation described above with reference to Tables 1 to 6, to the titanium metal. This powder is sprayed onto the metal before forming, for example, a six layer laminate of green tapes. Alternatively, a commercially available low-melting point lead-based glaze, for example, Homel F-92, may be applied to the surface of the titanium core prior to lamination. The inventors have determined that the application of this glaze reduces oxidation of the titanium and allows good mechanical locking of the titanium to the glass-ceramic composition in the lamination and co-firing processes.

A suitable bonding glaze may be made by reducing the particle size to less than 2 microns, mixing the glass powder with an organic liquid of a known amount, applying the mixture to the metal to achieve a known amount of glass on the metal core, for example 10 mg/inch$^2$. The glaze on the metal is then pre-flowed in a furnace with a peak firing temperature of approximately 550° C.

The inventors have determined that a laminate made using the green tape formulation set forth in Table 7 exhibits a good thermal expansion coefficient match to the titanium metal. The ceramic produced when the green tape and metal core are cofired has a dielectric constant of approximately 7. It also exhibits rheological properties, when in the green state, which enable groove formation suitable for the preparation of barrier ribs. Typical barrier ribs of up to 400 microns in height may be formed on the green tape, as described below with reference to FIGS. 3 and 4A, resulting in barrier ribs having a height of approximately 274 microns on the co-fired back plate.

It is well known in display technology that a black background beneath the red, green and blue phosphors enhances contrast in displayed images. This aspect of display technology may be implemented in a relatively straight-forward manner by adding a black coloring agent, such as cobalt oxide (CoO) into the formulation of the top layer of the tape or by spraying or screen painting a paste of the black coloring agent onto the top layer of the tape either before or after the co-firing of the panel at step 124 (shown in FIG. 1) but before the application of the phosphors at step 126.

At step 122 of FIG. 1, after the green tape has been laminated to attach it to the metal core, it is embossed or scribed to form the barrier ribs. Although scribing may be used to form the barrier ribs, the embodiments of the invention described below focus primarily on embossing as a means to form the ribs.

Figure 3:
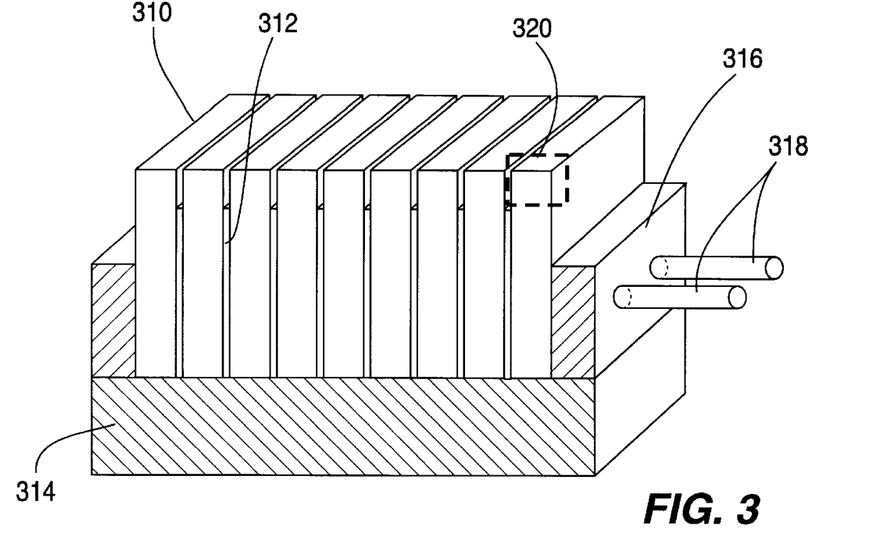
FIG. 3 is an isometric drawing of an embossing tool suitable for use in forming barrier ribs for a plasma display according to the present invention.

FIG. 3 is an isometric drawing of an embossing tool or die which may be used to form barrier ribs in the laminated green tape structure. The die is a "negative" of the desired barrier structure in the green tape. The die shown in FIG. 3 is made by stacking together sheet metal strips which alternate in width and thickness. The thickness of the different strips determines the die pitch and the difference in the width of the strips defines the rib height. A die of this type may be fabricated from any material which can be formed into strips, including stainless or tool steel, plastics or ceramics.

The exemplary die includes alternating thick strips 310 and thin strips 312. The thick strips 310 define the channels between the barrier ribs in the finished panel. Thus, the thick strips 310 are wider than the thin strips 312 to allow the barrier ribs to form between the thick strips. These wider strips desirably have smooth surfaces to help the green ceramic material to flow and release easily during the embossing process. The edge regions of the wider strips (e.g. the region 320) may also have a shape that is modified from rectangular (e.g. rounded) to provide an edge with good release characteristics and which also achieves the desired barrier shape in the green tape after embossing.

The two sets of metal strips having the same length but different thickness and width may be prepared, for example, using electro discharge machining (EDM) to achieve the desired smoothness. The strips are stacked alternately, one strip at a time from each set. The strips are desirably accurately positioned, for example, using a flat metal plate 314 and/or metal rails 318. The stack is then compressed from its sides to ensure good packing and uniform pitch. The stack may be secured in the compressed dimension by any of several known methods, such as welding, soldering, gluing or packing into a mandrel 316. Because the thickness tolerance of the metal strips is additive throughout the stack, a compressible metal (e.g. annealed copper) may be used for the thin strips of smaller width. The compressibility of these metal strips compensates for thickness tolerances.

The wider strips may be machined to modify their edges either before or after they are stacked to achieve angles that readily release the green tape during the embossing process. The edges may be modified by any of a number of known techniques such as glass bead blasting, sand blasting and lathe machining.

A die prepared as described above has several advantages over a conventional die, machined from a single piece of metal. It may be made very large and, thus, accommodate large-screen plasma displays; it may also be easily repaired or modified resulting in a longer lifetime than single-piece dies.

The die is pressed against the green tape, preferably after the green tape has been laminated to the metallic core in order to form the barrier ribs. When the laminated tape is embossed, the metal core forms a rigid substrate. The inventors have determined that the presence of this rigid substrate significantly enhances perpendicular flow of the green ceramic material, allowing it to more readily take the shape of the embossing tool. The inventors have also determined that it is advantageous for the pressing operation to be pulsed, that is to say, repeatedly pressing the die against the laminated green tape at relatively high pressure, separated by relaxation periods of zero pressure, all at a constant temperature. The application of high pressure forces the green tape into the voids between the thick bars of the die to form the barrier ribs. The relaxation periods cause the particles of the green tape to move apart, allowing the organic material to flow back between them, decreasing the viscosity of the green tape. Using this technique, the maximum pressure applied to the laminated green tape structure is decreased which decreases deformation and wear on the die. Barrier rib aspect ratios as high as 10 to 1 may be readily achieved using the embossing technique described above.

It is desirable, using this technique, for there to be a complete release of the tape from the die. One method by which this may be achieved is to place elastic spacers (not shown) under the die but outside of the embossed area. These spacers are compressed by the embossing pressures and provide a lifting force on the tool when the pressure is released. The inventors have determined that the pressurization of the elastic spacers prior to pressing the tool into the green ceramic also improves pressure distribution in the assembly and, thus, makes the height of the embossed barriers more uniform over the entire embossed area. It is contemplated that springs (not shown) may be used instead of elastic spacers.

Figure 4A:
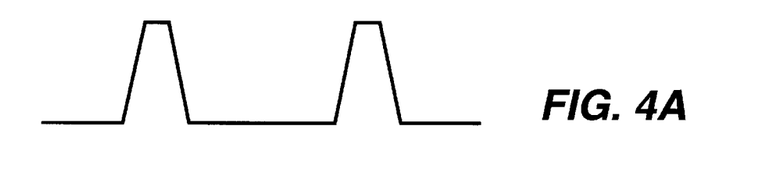
FIG. 4A is a cut away side plan view of an embossed barrier rib according to the present invention.
Figure 4B:
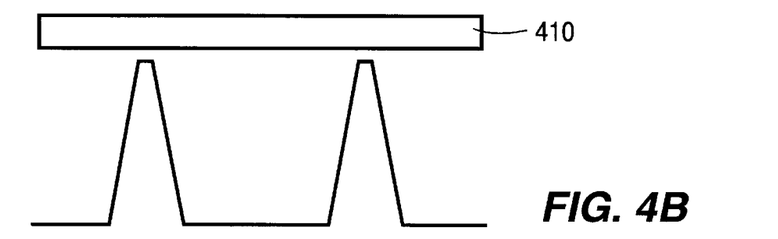
FIGS. 4B and 4C are cut away side plan views which are useful for describing the formation of a barrier rib structure which is thicker at the top than at the bottom.
Figure 4C:
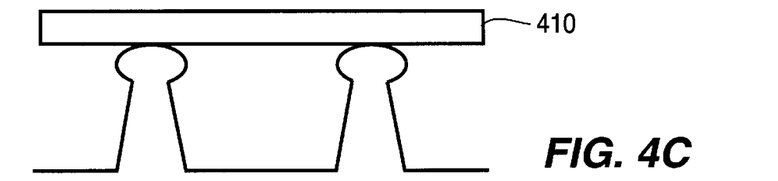

FIG. 4A shows an exemplary barrier rib structure that may be achieved using the embossing technique described above. In the design of a particular panel, it may be desirable to achieve a barrier rib shape such as that shown in FIG. 4C. This structure may not be formed by a simple embossing operation because the barrier ribs are wider at the top than at the bottom and, thus, do not permit an embossing die to be withdrawn. A structure such as that shown in FIG. 4C may be made, however, by processing an embossed structure using a laminating tool. As a first step, the green tape is embossed, as shown in FIG. 4B, to achieve a barrier height that is taller than desired. Next, a laminating tool presses against the tops of the green ceramic barrier ribs with a controlled pressure, causing them to bulge as shown in FIG. 4C. The pressure exerted by the laminating tool depends on the viscosity of the embossed green tape and on the amount of bulge that is desired in the tips of the ribs.

Figure 5:
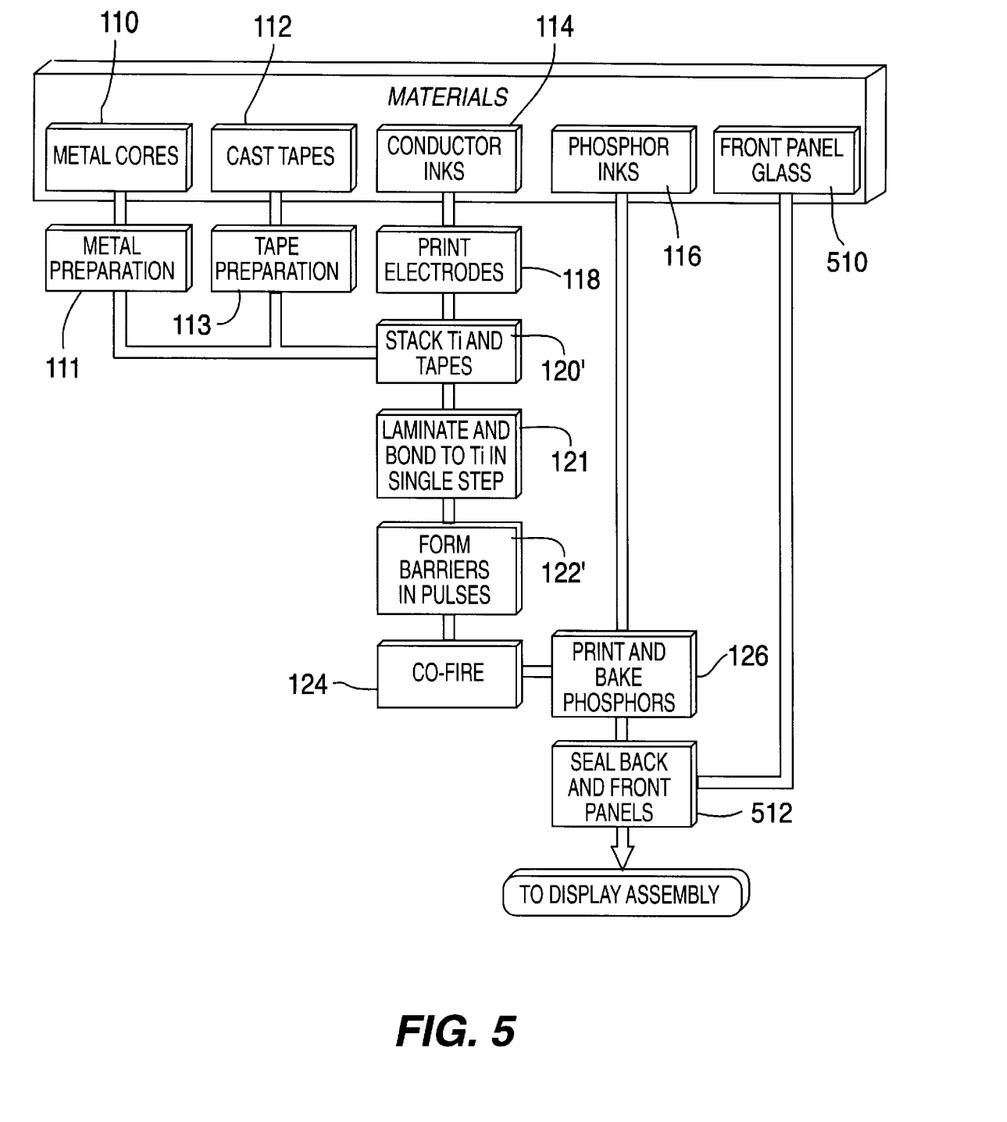
FIG. 5 is a flow chart showing the method of making the plasma display panel of the present invention.

FIG. 5 is a flow-chart diagram which illustrates the formation of a flat-panel display device according to the present invention. This flow-chart diagram is more detailed than the one shown in FIG. 1. In particular, the metal preparation step 111, in which a bonding glaze is applied to the titanium core, and tape preparation step 113, in which the tape blanks are cut, are explicitly shown. In addition, step 120 is divided into separate steps 120', in which the titanium core and the tape blanks are stacked, and step 121 in which the tape blanks are laminated to each other and bonded to the titanium core in a single step. Step 122' is also changed from FIG. 1 in that it recites that the barriers are formed using pulses of pressure. Finally, FIG. 5 differs from FIG. 1 by including the front panel glass 510 and the step 512 by which the front panel is attached to the back panel.

Figure 6A:
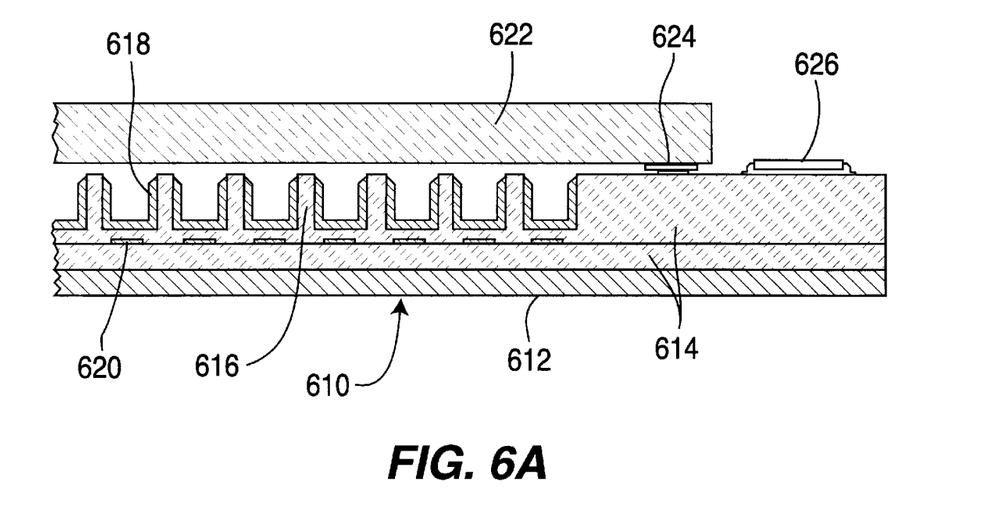
FIG. 6A is a cut-away side plan view of a first plasma display panel according to the present invention.
Figure 6B:
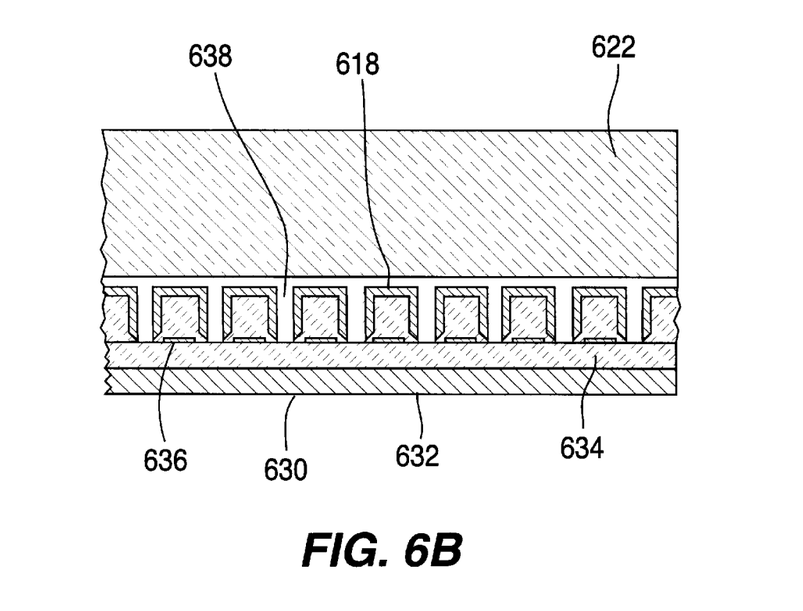
FIG. 6B is a cut-away side plan view of a second plasma display panel according to the present invention.

FIG. 6A is a cut-away side plan view taken along a line taken along a row of the display which illustrates the structure of a plasma display panel according to the subject invention. The panel includes a back panel 610 which includes a titanium core 612, and a laminated and embossed ceramic structure 614 which forms the barrier ribs for the display as well as the substrate on which the electronics 626 that control the display are mounted. Embedded in the ceramic structure 614 are the pixel electrodes 620. Above each electrode, on the surface of the embossed ceramic back panel is the phosphor 618 which is excited in order to emit colored light (red, green or blue). Above the back panel 610 is the front panel 622. The front panel is bonded to the back panel by a frit seal 624.

Although the barriers for the display panel have been described as being formed on the back panel during the formation of the back panel, they can alternatively be formed on the glass front panel. The fabrication of these barriers on the front glass sheet can be accomplished in the following ways:

1. Embossing or scribing a thick film of dielectric, deposited on top of the sheet glass in the form of a printable paste. A thick film of a dielectric, that is made by mixing frit glass powder materials with organics and is compatible with the sheet glass thermal and chemical properties. The dielectric may be deposited as a thick film by thick film deposition techniques, such as screen printing, after initial processing of glass, such as cleaning and/or electrode deposition. After the dielectric deposition, the thick film is embossed by means of a die that has the reverse of the desired rib structure such that the embossing/stamping of the thick film dielectric using this die gives the desired rib structure. Alternatively, the barrier rib structure can be achieved by scribing the thick film dielectric by means of a hard tool, capable or removing the dielectric material, and hence providing the channel-like ribbed structure. The embossing procedure can be utilized to make either the AC or the DC plasma display structure and is done prior to sintering/firing of the thick film dielectric. The scribing process, which may only be used to form an AC plasma display structure, however, may be done either before (preferably) or after the firing of the dielectric.

2. A frit material that is compatible with the sheet glass thermal and chemical properties can be cast in the form of a single or multiple thick film tapes that can be embossed, using a die as described above, to form the ribbed structure. The embossing process can occur either after the tape stack (laminate) has been culminated to pre-processed (cleaned and with or without electrodes deposited) sheet glass or can be embossed before and then culminated on top of the sheet glass. The embossed pattern can then be fired/sintered. In the case where the tape stack is first laminated on top of the pre-processed sheet glass, the ribbed structure can be formed by scribing with a hard tool that is capable of removing the laminated tape material cleanly and efficiently.

3. Embossing or scribing the sheet glass while hot and in the sheet glass manufacturing line itself. Either an embossing die or scribing tool can be used in the sheet glass manufacturing plant on-site making use of the ease-of-forming process of the glass while it is hot.

The front panel is bonded to the back panel using a frit material which is applied to the periphery of one or both panels. The panels are supported together and heated to a sufficiently high temperature to melt the frit material. The panels are then cooled, whereupon the frit solidifies and forms a gas-tight seal. The frit sealing temperature is typically in the range of 350° to 450° C. While it is desirable to closely match the TCE's of the front and back panels to ensure that the frit seal does not break during cooling or operation of the display, it may be difficult to obtain an exact match.

To compensate for minor differences in the thermal expansion coefficients when forming the seal between the back panel and the front panel, the panels can be heated to slightly different temperatures during the bonding process. If the frit seal temperature is $T_s$, and, if between room temperature and $T_s$ the glass has an average TCE ($TCE_g$) that is $\Delta TCE$ lower than that of the back panel, $TCE_b$, and if the glass is heated $\Delta T_s = T_s \cdot \Delta TCE/TCE_g$ hotter than the back panel, then the total contraction of the glass front pane, $(T_s + \Delta T_s) \cdot (TCE_b - \Delta TCE)$, will be the same, to $2^{nd}$ order, as that of the back panel ($T_s \cdot TCE_b$). For example, if soda-lime glass is used for the front panel with $TCE_g = 8.5 \times 10^{-6}/°C$., and if the $TCE_b$ of the back panel is $\Delta TCE = 0.1 \times 10^{-6}/°C$. greater than that of the front panel, and frit sealing is accomplished at 450° C., then the system can be compensated by heating the glass front panel 5.3° C. hotter than the back panel during frit sealing.

Various methods may be used to implement this temperature difference. For example, heating sources above and below the panels in the furnace may be heated to different temperatures establishing a temperature gradient between the front panel and back panel. Alternatively, this process may be implemented by variation of cooling provisions for the top and bottom of the sealed assembly after it is removed from the furnace.

Moreover, this approach may be used more generally, to compensate for difference in temperature dependence between the front and back panels. In a belt furnace, the cooling zones may be programmed to produce specific temperature differences between the front and back panels as a function of the panel temperature to provide compensation for TCE differences as the assembly cools.

An alternative approach to compensate for small differences in TCE between the metal/ceramic back panel and the glass front panel is to formulate a ceramic composition which has a TCE that is slightly greater than, or slightly less than that of the metal core. The composite ceramic-metal system has a TCE which is intermediate between the two TCEs. The TCE of the ceramic may be adjusted within a small range so that the intermediate value matches the TCE of the front panel. In addition, the ceramic material may be bonded both to the front and back of the metal core to prevent the ceramic-metal assembly from warping when it is cofired due do the difference between the respective TCEs.

While the invention has been described in terms of an exemplary embodiment, it is contemplated that it may be practiced as described above with modifications within the scope of the appended claims.

The invention claimed is:

1. A back panel for a plasma display device comprising:
   a metal core having a temperature coefficient of expansion (TCE);
   a ceramic structure bonded to the metal core, the ceramic structure having a TCE that matches the TCE of the metal core, the ceramic structure having features which define barrier ribs of the plasma display panel.

2. A back panel for a plasma display device according to claim 1, wherein the ceramic structure has a formulation defined by percent weight as:
   Glass 1 65.00–95.00
   Glass 2 30.00–5.00
   $TiO_2$ 0.01–2.00
   Cordierite 0.01–2.00
   Forsterite 0.01–2.00
wherein Glass 1 has a formulation defined by percent weight as:
   ZnO 15.00–50.00
   MgO 10.00–45.00
   $B_2O_3$ 5.00–30.00
   $SiO_2$ 10.00–45.00
and Glass 2 has a formulation defined by percent weight as
   $Al_2O_3$ 5.00–30.00
   MgO 30.00–55.00
   $P_2O_5$ 0.01–4.00
   $B_2O_3$ 0.01–4.00
   $SiO_2$ 0.01–4.00.

3. A back panel for a plasma display device according to claim 2, wherein the ceramic structure has a formulation defined by percent weight as:
   Glass 1 85.00
   Glass 2 12.00
   $TiO_2$ 1.00
   Cordierite 1.00
   Forsterite 1.00
wherein Glass 1 has a formulation defined by percent weight as:
   ZnO 30.00
   MgO 25.00
   $B_2O_3$ 20.00
   $SiO_2$ 25.00
and Glass 2 has a formulation defined by percent weight as
   $Al_2O_3$ 16.81
   MgO 42.01
   $P_2O_5$ 0.84
   $B_2O_3$ 0.84
   $Si_2$ 39.50.

4. A back panel for a plasma display device according to claim 1, wherein the metal core is made from Titanium.

5. A plasma display device comprising:
   a front panel formed from glass and having a thermal coefficient of expansion (TCE) of approximately $8.5 \times 10^{-6}$; and
   a back panel comprising:
      a metal core having a TCE of approximately $8.5 \times 10^{-6}$; and
      a ceramic structure defining barrier ribs for the plasma display device, the ceramic structure having a TCE of approximately $8.5 \times 10^{-6}$ and being bound to the metal core.

* * * * *